United States Patent

[11] 3,604,666

| | | |
|---|---|---|
| [72] | Inventor | Melvin B. Achberger<br>Cuyahoga Falls, Ohio |
| [21] | Appl. No. | 852,769 |
| [22] | Filed | Aug. 25, 1969 |
| [45] | Patented | Sept. 14, 1971 |
| [73] | Assignee | The B. F. Goodrich Company<br>New York, N.Y. |

[54] PNEUMATIC DEICER
5 Claims, 5 Drawing Figs.

[52] U.S. Cl. .................................................. 244/134 A
[51] Int. Cl. .................................................. B64d 15/16
[50] Field of Search ...................................... 244/134

[56] References Cited
UNITED STATES PATENTS 2,440,240  4/1948  Antonson .................. 244/134
2,446,328  8/1948  Heston ..................... 244/134

FOREIGN PATENTS 1,271,461  8/1961  France ..................... 244/134

*Primary Examiner*—Milton Buchler
*Assistant Examiner*—Gregory W. O'Connor
*Attorneys*—John D. Haney and Harold S. Meyer ABSTRACT: A pneumatic deicer having a series of inflatable tubes which are alternately extended by inflation to break up ice accumulations in which the tubes are interconnected by plies of porous fabric having spaced projecting elements providing interstices through which air passes and sealing members adhered to the plies and tubes at the openings to provide an airtight assembly.

PATENTED SEP 14 1971 3,604,666
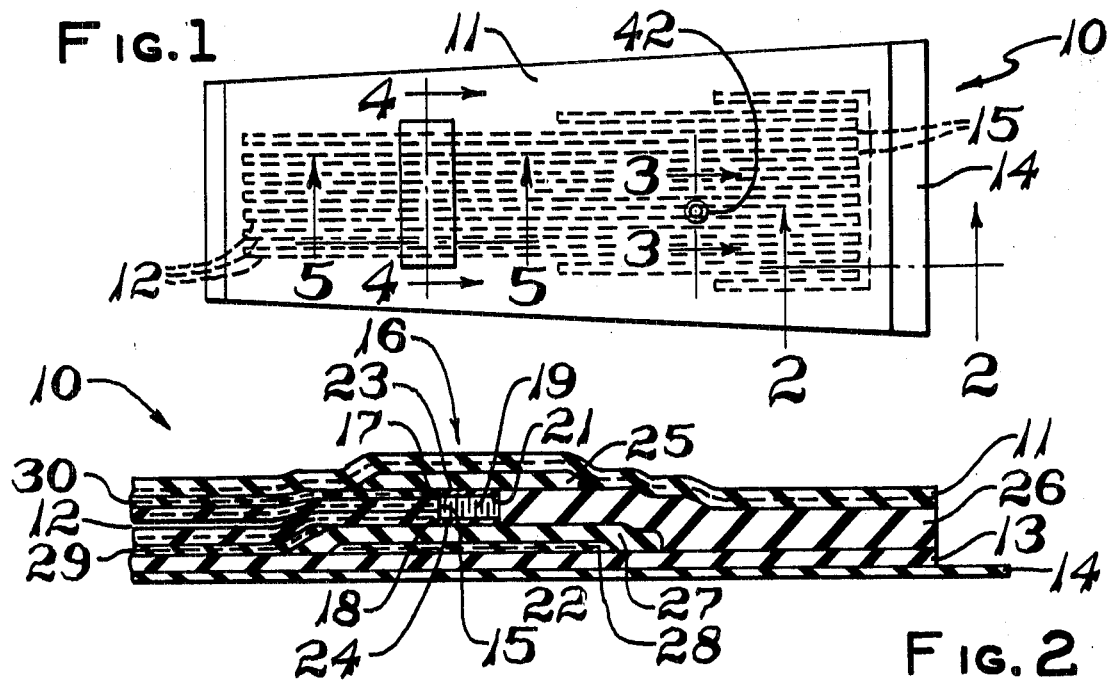
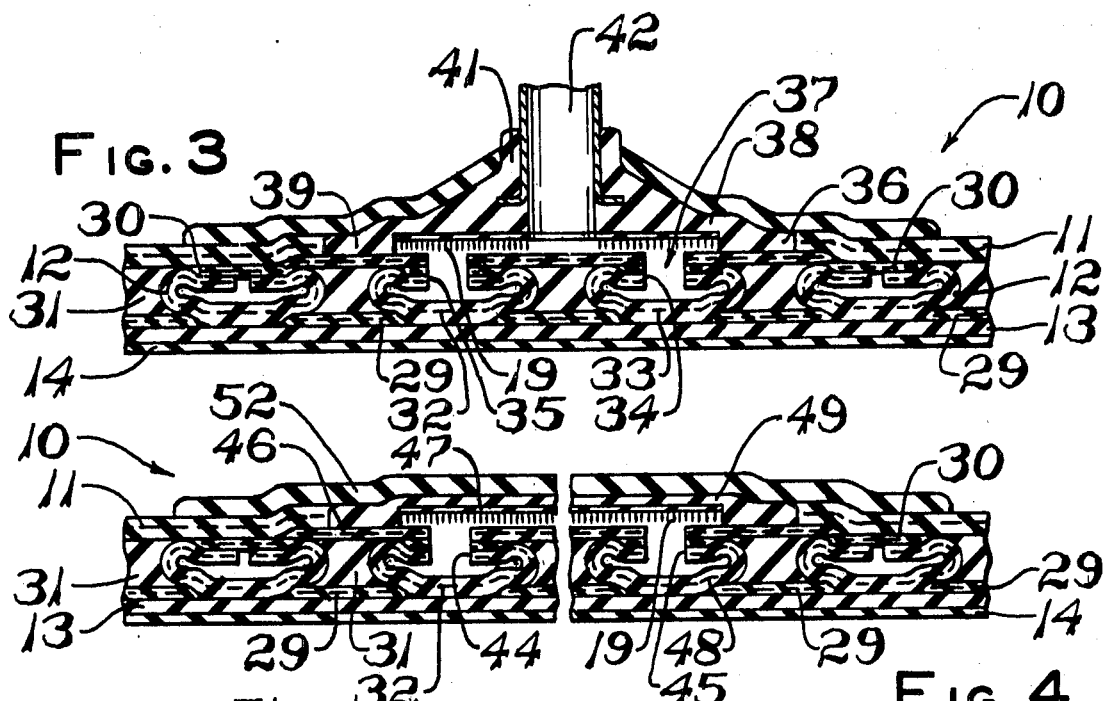
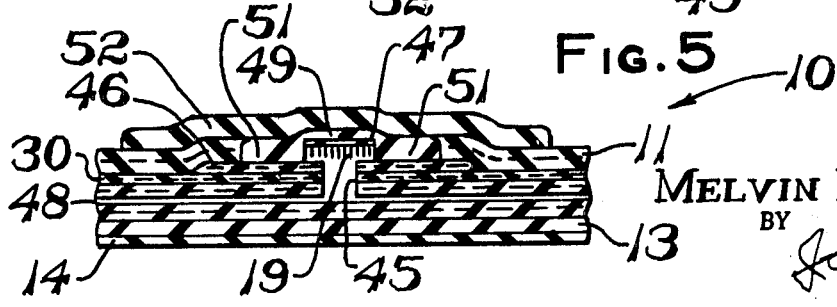
INVENTOR.
MELVIN B. ACHBERGER
BY John D. Haney
ATTY.

PNEUMATIC DEICER

BACKGROUND OF THE INVENTION

This invention relates to pneumatic deicers of the type in which a boot of resilient material such as rubber is attached to the leading edge of an airfoil and has a series of inflatable tubes which are alternately extended by inflation pressure to break up ice accumulation which tends to form on the surface of the boot exposed to the airflow. Ordinarily, the tubes are arranged so that they extend generally parallel to each other in the spanwise direction of the leading edge of the airfoil; however, the tubes may be arranged to extend in the direction of the airfoil or in any other angular position.

In order to inflate the tubes of the deicer, it has been the practice to use a manifold tube extending transversely of and overlying the tubes. Between the manifold tube and the inflatable tubes there were ports through which the air would pass to inflate and deflate the tubes. The manifold tube was connected by a filler pipe or other connection to the source of air pressure and vacuum in the aircraft.

It has been found that in the manufacture of a boot assembly with manifold tubes considerable difficulty and extra care is required to build in the ports between the inflatable tubes and the manifold tubes. If this care is not exercised, the ports may not register properly or be inadequately sealed.

Another difficulty with this construction, especially when the manifold tube is built integrally into the boot structure, is that it causes an objectionable thickness in the deicer boot in the area where the manifold tube is located. Not only is this thick section or ridge detrimental to the appearance of the deicer but it also tends to create an area where the skin plies of the deicer are more highly stressed than in other locations providing a potential failure point after repeated flexures.

To maintain the manifold tube in an open condition and provide adequate bleeding of the inflation tubes during the deflation cycle, ridges or other separating devices have been built into the manifold tube to prevent the tube from prematurely closing and thereby trapping inflation air in the inflatable tubes. These separating devices have also increased the thickness of the manifold tube and in some cases the section containing the manifold tube has had a thickness double the thickness of the portion of the boot containing only the inflation tubes.

The use of deicers on airfoils subjects them to aerodynamic conditions and it has been found that the ridge on the deicer boot caused by the manifold tubes has a tendency to interfere with the proper airflow across the airfoil. This ridge moreover causes an erosion and the skin of the deicer in the area of the ridge has been pitted and eroded by the impingement of ice, sleet, rain and other particles in the air due to this aerodynamic irregularity.

SUMMARY OF THE INVENTION

The pneumatic deicer of this invention provides a boot which is substantially smooth and of uniform thickness throughout. This is accomplished by eliminating as a structural feature the transverse manifold tube and building the deicer boot in such a way that the manifolding function is provided by special manifold plies adjoining the ends of the inflatable tubes. Cross communication between the inflatable tubes at their extreme ends is provided through the tube ends and manifold plies so that the function of the manifold tube is preserved without the necessity of a thick manifold tube being built into the deicer structure. These manifold plies may be built in at either end of the inflatable tubes or they may be used intermediate the ends for connecting tubes which have been cut off by the requirement for openings in the deicer boot. Where it is necessary, the manifold plies may overlie the inflatable tubes which will increase the thickness of the boot at the section containing the manifold plies; however, the total thickness will be substantially less than that caused by a manifold tube.

The use of a manifold ply for supplying air and applying vacuum to the inflatable tubes is also advantageous since the manufacture of such connections is greatly simplified over the manufacture of a manifold tube for this purpose. The resulting connection can also be located at a position which is most suitable for the aircraft on which the deicer is to be used.

The manifold plies have a surface which can be adhered to a sealing member of impervious material; however, this surface is also porous to provide for the passage of air through the fabric where this is desirable. On the other surface of the fabric, a plurality of projecting elements extend outward providing a great number of interstices through which the air may flow to and from the inflatable tubes. These interstices through the manifold plies remain open under all conditions and insure that adequate bleeding of the inflatable tubes is provided during the deflation cycle.

The accompanying drawings show one preferred form of deicer boot made in accordance with and embodying this invention and which is representative of how this invention may be practiced.

BRIEF DESCRIPTION OF THE DRAWING

In the drawing:

FIG. 1 is a plan view of the deicer boot with the position of the inflatable tubes being shown in dotted lines;

FIG. 2 is an enlarged section taken along line 2—2 of FIG. 1 with parts being broken away;

FIG. 3 is an enlarged section taken along line 3—3 of FIG. 1 with parts being broken away;

FIG. 4 is an enlarged section taken along line 4—4 of FIG. 1 with parts being broken away; and FIG. 5 is an enlarged section taken along line 5—5 of FIG. 1 with parts being broken away.

DETAILED DESCRIPTION

A laminated inflatable deicer boot 10 is shown in FIG. 1 in the condition prior to installation on an airfoil and with the top surface being that which is in contact with the airfoil after installation. As shown in FIGS. 1 and 2, the top ply 11 which may be of fabric coated with rubber or other resilient rubberlike material extends over a series of longitudinal tubular members such as inflation tubes 12 shown in dotted lines in FIG. 1. These inflation tubes 12 may be of nylon or similar fabric which is covered with rubber or other resilient rubberlike material. The fabric of the inflation tubes 12 is woven in such a manner that the tubes may expand during inflation but are not extensible in the longitudinal direction. A bottom ply 13 is disposed under the inflation tubes 12 and may be of resilient rubber or other rubberlike material. Covering the bottom ply 13 on the external airflow side of the boot 10 is a sheet member 14 of resilient rubberlike material such as Neoprene.

As shown in FIG. 2, open ends 15 of the inflation tubes 12 terminate in a position where they adjoin a manifold ply 16. This manifold ply 16 extends transversely of the deicer boot 10 and connects with the open ends 15 of the inflation tubes 12 to provide a passage between the tubes for communication of air or other suitable inflating medium. The manifold ply 16 in this embodiment has an upper layer of fabric 17 and a lower layer of fabric 18 although a manifold ply with one layer or several layers may be used. Preferably the fabric of the manifold ply 16 is porous to permit passage of air through the fabric and has a plurality of closely spaced elements such as stiff fibers 19 projecting outwardly from the fabric to provide interstices through which the inflating medium can flow. Surface 21 of the upper layer of fabric 17 carries the fibers 19 and surface 22 of the lower layer of fabric 18 carries the fibers 19. The other surface 23 of the upper layer of fabric 17 and the other surface 24 of the lower layer of fabric 18 are preferably smooth to permit adhesion to sealing members such as upper sheet 25, filler sheet 26 and lower sheet 27 which are of a material impervious to air and may be of resilient rubber or other rubberlike material. As shown in FIG. 2, the fibers 19 of the upper layer 17 and the fibers 19 of the lower layer 18 extend toward each other as the surfaces carrying these fibers face one another.

The upper sheet 25, filler sheet 26 and lower sheet 27 are adhered to the manifold ply 16 and the inflation tubes 12 in the area around the open ends 15. Reinforcing fabric such as tape 28 of rubberized fabric is disposed under the manifold ply 16 between the bottom ply 13 and the lower sheet 27 and may be of a bias-cut fabric to permit some resilient distension and contraction during inflation of the deicer boot 10. Other reinforcing members of bias-cut reinforcing tape are built in the boot 10 such as lower strips 29 and upper strips 30. The lower strips extend longitudinally between the inflation tubes 12 over the bottom ply 13 on one side and under extensions 31 of filler sheet 26 which are located in the spaces between the inflation tubes 12. The upper strips 30 extend longitudinally between the inflation tubes 12 and the top ply 11. This is shown more clearly in FIGS. 3 and 4.

The inflation air and vacuum supplied to the boot 10 by the aircraft may be connected directly to the manifold ply 16 at the ends of the inflation tubes 12; however, in this embodiment the supply is connected at a position spaced from the ends 15 of the inflation tubes 12. As shown in FIG. 3, it was desirable to supply air and vacuum simultaneously to both inflation tubes 32 and 33 with a manifold ply 37.

Ports 34 and 35 in inflation tubes 32 and 33 open on the upper side of the boot 10 and extend through a washer 36 of reinforcing fabric material which is covered by an annular layer of manifold ply 37 with the stiff fibers 19 extending towards the ports 34 and 35 and a smooth surface adhered to a sealing member such as washer 38 which has offset flanges 39 abutting the washer 36.

Seated on the washer 38 is a frustoconical annular supporting member 41 of resilient rubber or other rubberlike material which contains a hollow body of steel or suitable material for the supply of inflating medium from the aircraft supply such as filler pipe 42. An annular covering member of reinforced fabric such as covering 43 overlaps the supporting member 41 and the top ply 11. The manifold ply 37 provides the passages from the filler pipe 42 through the ports 34 and 35 into the inflatable tubes 32 and 33 which are in turn connected to all of the inflatable tubes 12 through the manifold ply 16 at the ends 15 of the inflation tubes.

Another application of the invention is shown in FIGS. 4 and 5 where a manifold is necessary to supply air and vacuum to the outer extremities of tubes 32 and 33 because of an opening in the deicer boot to provide access to the inside of the airfoil. Ports 44 and 45 in tubes 32 and 48 respectively extend upwardly through a reinforcing strip 46 and open on a connecting manifold ply 47 which extends across the inflatable tubes to the port 45 in the inflatable tube 48 and similar ports in the other tubes crossed by the manifold ply. A grooved member 49 of sealing material impervious to air extends over the manifold 47 and has flanges 51 abutting the reinforcing strip 46 and adhered to the inflation tubes 12 in the area surrounding the ports 44 and 45 shown in FIGS. 4 and 5. The stiff fibers 19 of the manifold ply extend down towards the ports 44 and 45 and engage the reinforcing strip 46 to provide passages through the interstices between the fibers for air to flow between the inflation tubes 12. A covering strip 52 of reinforcing material such as fabric coated with rubber or other rubberlike material is disposed in overlapping relationship over the grooved member 49 and the top ply 11.

In the manufacture of the deicer boot 10 described heretofore the parts are cemented together and may be vulcanized to provide a unitary structure which will withstand the severe operating conditions which are found on the airfoil of an aircraft and especially on the leading edge where a deicer is mounted. A deicer boot 10 of this type may be mounted on any airfoil of an aircraft with a number of different types of fasteners all of which are well known to those skilled in the art.

I, therefore, particularly point out and distinctly claim as my invention:

1. An inflatable deicer boot for mounting on an airfoil comprising a series of tubular members which can be selectively inflated and deflated to break up a formation of ice on said airfoil, a manifold ply adjusting at least two of said tubular members in the area around openings in said members for the passage of the inflating medium through said openings, and sealing layers of a material impervious to said inflating medium overlaying said manifold ply and said tubular members, and said manifold ply being characterized by a layer of fabric which has one surface adhered to said sealing layers and on its opposite surface a multitude of stiff short fibers projecting toward said tube openings and providing interstices through which the inflating medium can flow to and from said tubular members.

2. An inflatable deicer boot according to claim 1 wherein the openings in said tubular members are the axial open ends of said tubular members and said manifold ply adjoins said open ends with said stiff fibers projecting transversely to the length of said tubular members.

3. An inflatable deicer boot according to claim 2 and further characterized in that said manifold ply includes a second layer of fabric located at a position adjoining said open ends of said tubular members and which has one surface adhered to said sealing members and which has on its opposite surface a multitude of stiff short fibers directed toward and meshed with the corresponding fibers of the first said layer.

4. A laminated deicer boot for mounting on an airfoil comprising a bottom ply, a series of spaced-apart tubular members positioned over said bottom ply for inflation by an inflating medium, a manifold ply adjoining at least two of said tubular members in the areas around openings in said members for the passage of the inflating medium through said openings, sealing members of a material impervious to said inflating medium located around and in sealing engagement with said manifold ply and said tubular member, and said manifold ply being characterized by a plurality of closely spaced fibers which are stiff in their lengthwise direction and which extend transversely to the lamination at said openings for providing interstices through which the inflating medium can flow to and from said tubular members, and a top ply covering said tubular members and said manifold ply.

5. A laminated deicer boot according to claim 4 wherein the openings in said tubular members are the axial end openings of the tubular members, and wherein the length dimension of said stiff fibers does not exceed the flattened thickness of said tube ends so that the distance between the top and the bottom plies of the boot will be substantially the same throughout.